June 16, 1942.　　　F. W. BROOKE　　　2,286,667
SELF-LOCKING NUT
Filed June 4, 1941
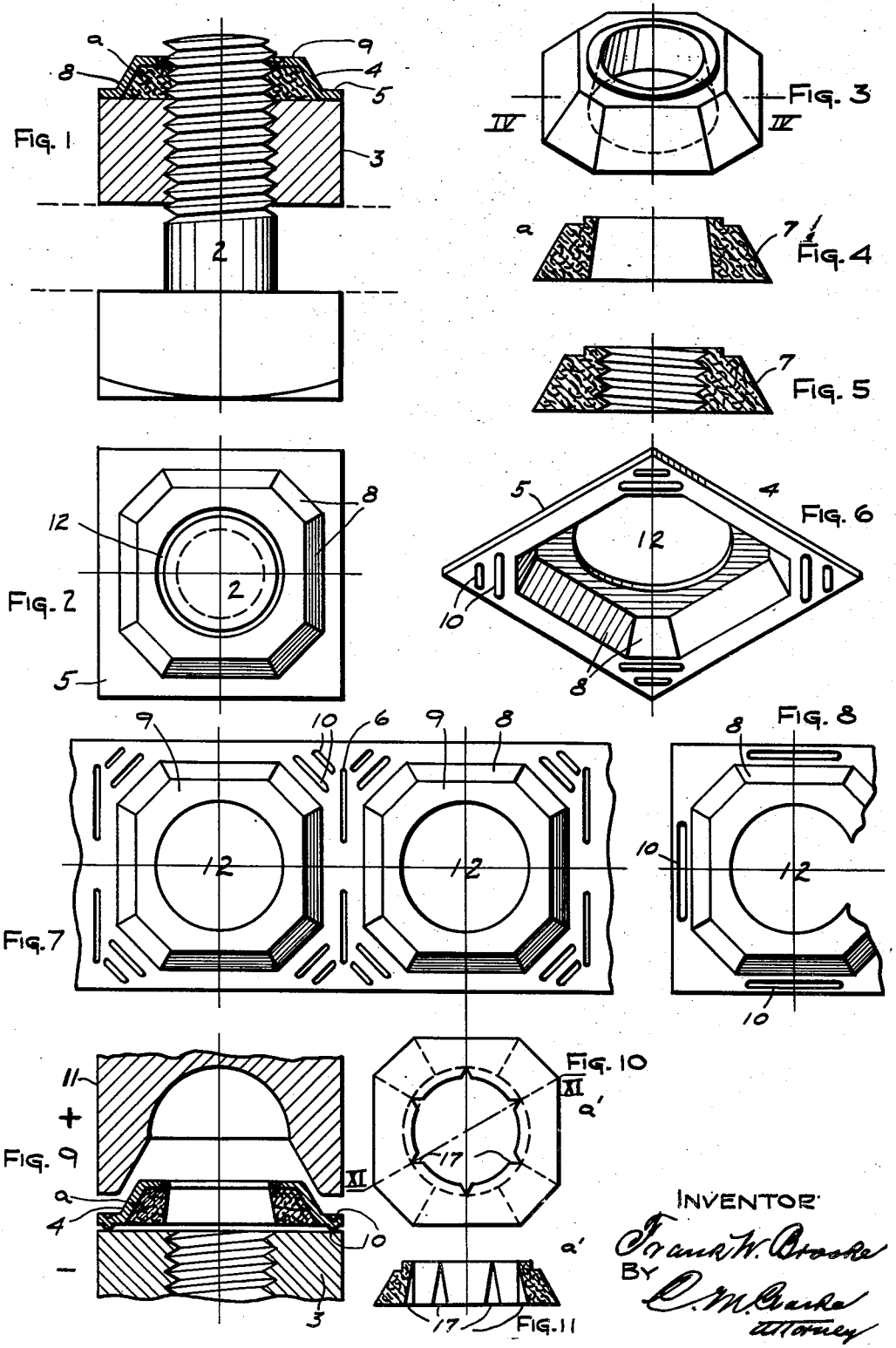

Patented June 16, 1942

2,286,667

UNITED STATES PATENT OFFICE 2,286,667

SELF-LOCKING NUT

Frank W. Brooke, Pittsburgh, Pa.

Application June 4, 1941, Serial No. 396,547

7 Claims. (Cl. 151—7)

This invention is an improvement in the general class of nut locks for preventing undesired loosening of a nut on its bolt because of vibration, wear, or other causes.

Specifically it utilizes a plastic body of suitable material, immovably and separately held on the outer face portion of the nut, and adapted to deformation by and to form with the threaded end of the bolt, an intimate close holding connection with its threads. Heretofore such devices have been made and used by utilizing a special form of nut which is so constructed as to receive and by an integral lip, to embrace the bolt-engaging holding unit.

My improvement is so designed as to be used with any standard nut, either square, hexagonal, or of other preferred form, and in connection with a holding or locking unit of special and useful qualities.

The present application relates to the final product as well as its method of manufacture, as hereinafter described.

In the drawing, showing one preferred form of the invention:

Fig. 1 is a view of a bolt with the improved attachment and nut, in section;

Fig. 2 is a plan view thereof;

Fig. 3 is a perspective view of the thread engaging unit;

Fig. 4 is a vertical section of the unit on the line IV—IV of Fig. 3;

Fig. 5 is a similar view of the unit after being engaged by the threaded bolt;

Fig. 6 is a perspective view of the under side of the unit retaining cap or housing;

Fig. 7 is a plan view of a portion of the continuous sheet metal strip from which the caps are made;

Fig. 8 is a partial under plan view of one of the caps, showing a modification;

Fig. 9 is a vertical sectional view illustrating the welding connection of the cap to the nut;

Fig. 10 is an under plan view of a modified form of unit;

Fig. 11 is a cross section on the line XI—XI of Fig. 10.

Referring to the drawing, the bolt 2 and nut 3 are of usual standard construction and of any dimensions as to length, diameter, gauge of threads, or shape of nut; i. e., square, hexagonal, octagonal, etc., as desired.

Secured upon the outer face of nut 3 by its flanges 5 is a coniform cap 4, made as hereinafter described, and enclosing the thread engaging unit a. Such unit is of a composition sufficiently plastic and mobile for sufficient deformation to be acted upon by the entering terminal threads of the bolt, as the nut is applied, and by compression and compensating movement, to become closely engaged with the threads throughout the depth of the unit.

While any suitable substance or material may be utilized for such preformed unit, such as fibre, fibrous homogeneous composition, comminuted cork, etc., I prefer to use a composition including asbestos fibre or other heat resisting material, and a binder, as more fully disclosed in my companion application for Self-locking nut and method of assembling same, Ser. No. 396,548 filed herewith.

The preformed unit a is shown in Figs. 3 and 4, while Fig. 5 shows it as deformed by the threads of the entering bolt when the nut is applied, Figs. 4 and 5 being slightly enlarged.

The cap 4 is made of relatively thin sheet metal stamped from a continuous blank having transverse slits 6 for easy and accurate shearing, to provide the rectangular base within the flanges 5 conforming to the outer face of nut 3.

In the case of a hexagonal or other form of nut, the outline of the base would be made conformably with the outer edges matching those of such nut. As shown the middle cap portion 4 is of a form to receive the sloping faces 7 of unit a when the unit is inserted in the cap, as in Fig. 1.

Both are of generally irregular octagonal form, the cap having sloping walls 8, the inner faces of which engage corresponding sloping faces 7 of the preformed unit as also the corner portions thereof. By such construction, when the cap is secured to the nut by its flanges, rotation of the unit by the bolt in entering is prevented.

The cap may be secured to the nut in any convenient manner, preferably by spot welding, under pressure.

Spot welding is facilitated by providing depression areas at suitable locations, as by grooves and opposite ribs or other pressed out sections 10 of the metal flanges at the corners, as in Fig. 6, or at the sides as in Fig. 8.

Fig. 9 illustrates such operation wherein the cap being properly located on the face of the nut, the head 11 of the spot welding machine, connected by its pole, is lowered, and while exerting pressure, causes the welding current to flow and concentrate through the depression areas of the cap, providing strong holding connection with the nut. As shown, the cap is provided with a middle clearance opening 12 for the bolt, as in Fig. 1.

By making the blank in continuous strip form and subjecting it to successively spaced deformation treatments, the units may then be inserted, followed by severance and removal for application to appropriate conforming nuts, as described in my said companion application.

In the case of providing for other shapes of nuts, as hexagonal, octagonal, etc., the same operations are followed with but slight waste of the used blanks.

I show in Figs. 10 and 11 a modified form of unit a' of the same general shape and makeup as above described, in which the inner walls of the middle cavity are grooved as at 17, tapering towards the top. By such construction, as the end of the bolt enters it will easily be inserted and make advancing progress and will come into close engaging and deforming contact with the unit and effect close engagement with the threads, by reason of the clearance of the tapering grooves. In such construction, instead of exerting pressure longitudinally of the axial center of the unit, such pressure is exerted laterally and is absorbed by the buttressing effect of the sloping walls of the cap 4.

The construction and method of making the caps of my improved self-locking nut will be clearly understood and appreciated by all those skilled in the art. It is extremely simple and economical to make and use, very efficient in operation, and with the contained unit, positively overcomes and compensates for vibration loosening.

The length of any commercial size of nut from the largest to the smallest is but slightly increased, and the nut and its connected thread-engaging unit may be handled commercially as a standard article.

It eliminates all axial play and maintains constant pressure on the load carrying sides of the threads.

What I claim is:

1. A nut provided on its outer face with a welded on cap having polygonal retaining walls and a central bolt clearance opening, and a thread engaging homogeneous unit of fibrous mobile material non-rotatably held in said cap.

2. A nut provided on its outer face with a welded-on retaining cap having a top provided with a bolt clearance opening and polygonal inner wall faces in holding engagement with a pre-formed thread engaging unit of homogeneous material having a pre-formed tapered bolt receiving opening.

3. In combination with a flat faced nut, a separately formed cap attached to the outer face of said nut, said cap having a surrounding flange secured to the nut and outwardly disposed polygonal tapered walls and an apertured top in holding engagement with a contained pre-formed unit of homogeneous plastic thread engaging material secured within said cap.

4. In combination with a flat faced nut, a separately formed cap attached to the outer face of said nut, said cap having outwardly and inwardly tapering walls of polygonal cross section, a centrally open covering top, and a surrounding flange welded to the nut, and a homogeneous fibrous unit held within said cap walls having a pre-formed central bolt engaging opening.

5. A pre-formed fibrous unit of homogeneous material for a self locking nut consisting of a compressed non-circular body having a central bolt engaging opening provided with a series of tapered grooves in the inner wall faces of said opening.

6. A pre-formed fibrous unit for a self-locking nut consisting of a compressed homogeneous body of comminuted asbestos fibre and binder therefor having a central bolt engaging opening and outwardly and inwardly sloping polygonal face side walls for engagement with a conformably shaped outer retaining cap.

7. Means for holding a nut in fixed connection with a bolt consisting of a cap adapted to be separately secured to the nut having outwardly and inwardly sloping polygonal face retaining walls in fixed holding engagement with a contained thread engaging unit of plastic material having conformably shaped faces for holding engagement by the cap.

FRANK W. BROOKE.